Figure 1:
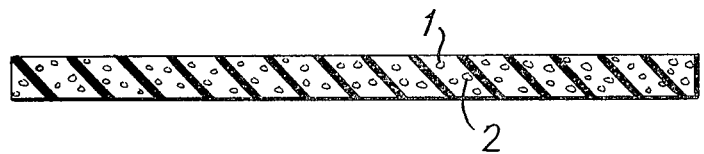

United States Patent [19]

Fujitani et al.

[11] 4,258,100
[45] Mar. 24, 1981

[54] PRESSURE-SENSITIVE ELECTRIC CONDUCTIVE SHEET MATERIAL

[75] Inventors: Takeo Fujitani, Osaka; Kajio Matsuoka, Tondabayashi, both of Japan

[73] Assignee: Kabushiki Kaisha Kyowa, Osaka, Japan

[21] Appl. No.: 940,058

[22] Filed: Sep. 6, 1978

[30] Foreign Application Priority Data

Sep. 9, 1977 [JP] Japan .......................... 52-122132[U]

[51] Int. Cl.³ .......................... B32B 5/18; B32B 5/22
[52] U.S. Cl. .................................. 428/315; 219/91.21; 228/214; 252/513; 338/114; 428/328; 428/354; 428/356
[58] Field of Search ................ 427/123; 428/306, 242, 428/309, 263, 313, 281, 315, 283, 328, 553, 329, 558, 343, 560, 344, 562, 355, 563, 356, 922, 367, 354; 228/214; 219/91.21; 338/114; 252/513, 514

[56] References Cited

U.S. PATENT DOCUMENTS

| | | | |
|---|---|---|---|
| 2,472,214 | 6/1979 | Hurvitz | 338/114 |
| 2,485,725 | 10/1949 | Francis, Jr. | 428/263 |
| 2,510,727 | 6/1950 | Sussenbach | 219/91.21 |
| 3,235,772 | 2/1966 | Gurin | 428/909 |
| 3,475,213 | 10/1969 | Stow | 427/123 |
| 3,514,326 | 5/1970 | Stow | 428/328 |
| 3,622,432 | 11/1971 | McCluer et al. | 428/281 |
| 3,648,002 | 3/1972 | Du Rocher | 338/114 |
| 3,649,438 | 3/1972 | Walker et al. | 428/560 |
| 3,794,790 | 2/1974 | Leyland | 338/114 |
| 3,891,786 | 6/1975 | Conklin | 428/367 |
| 4,054,540 | 10/1977 | Michalchik | 338/114 |
| 4,098,945 | 7/1978 | Oehmke | 428/343 |
| 4,145,317 | 3/1979 | Sado et al. | 252/513 |

Primary Examiner—William J. Van Balen

[57] ABSTRACT

Pressure-sensitive electric conductive sheet material is provided, which comprises at least one layer of a rubbery elastic material wherein are substantially uniformly distributed fine particles of electric conductive metal.

14 Claims, 4 Drawing Figures

PRESSURE-SENSITIVE ELECTRIC CONDUCTIVE SHEET MATERIAL

This invention relates to a pressure-sensitive electric conductive sheet material. More particularly this invention relates to a pressure-sensitive electric conductive sheet material which comprises at least one layer of a rubbery elastic material wherein are substantially uniformly dispersed fine particles of electric conductive metal.

The term "pressure-sensitive electric conductive" property as used herein means that the sheet material is electrically substantially non-conductive in normal state or non-pressed state but becomes electrically conductive when a vertical pressure is applied thereto.

It is known to fill a rubbing sheet material with carbon black powder to render the sheet electric-conductive. However such conventional electric conductive sheet material is not pressure-sensitive because in order to obtain sufficient electric conductivity an extremely large amount of the carbon black powder must be mixed with the rubbery material, which would result in loss of desired elastic property.

Therefore it is an object of this invention to provide a pressure-sensitive electric conductive sheet material.

Figure 2:
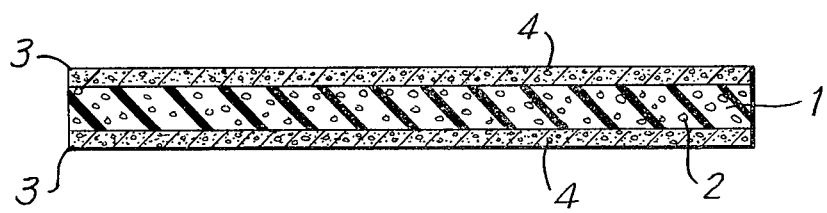
Figure 3:
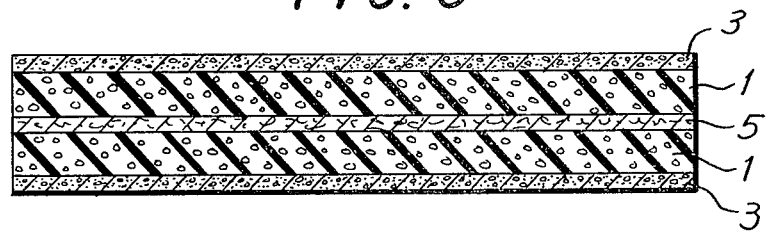
Figure 4:
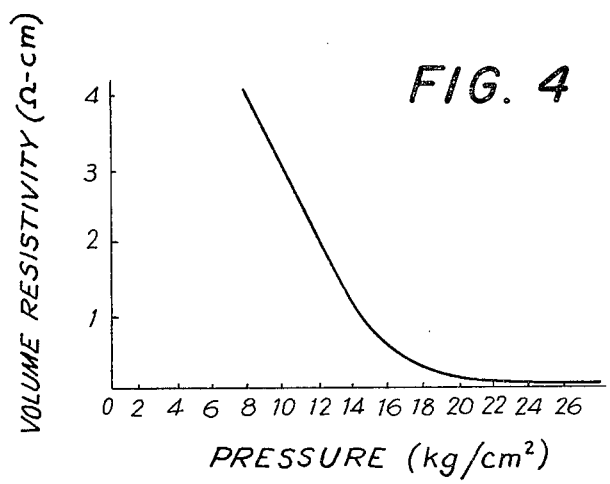
Figure 5:
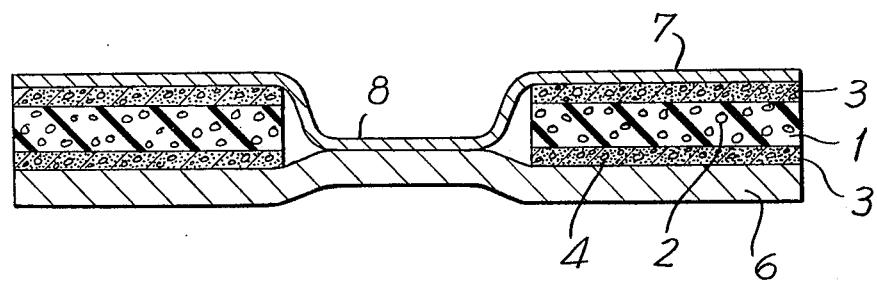

Other objects of this invention will become apparent from the following description which will be made by referring partly to the accompanying drawings wherein:

FIG. 1 is a schematic cross-section of a sheet material according to this invention, FIG. 2 is a schematic cross-section of another sheet material according to this invention, FIG. 3 is a schematic cross-section of still another embodiment of this invention, FIG. 4 is a graph showing the relation between electric conductivity of a sheet material embodying this invention and a pressure applied thereto.

Briefly, a pressure-sensitive electric conductive sheet material of this invention comprises at least one layer of rubbery elastic material wherein are dispersed fine particles of electric conductive metal.

The rubbery elastic material includes natural and synthetic rubbers as well as synthetic plastic materials which have elastic deformability. These materials include natural rubber (NR), isoprene rubber (IR), styrene butadiene rubber (SBR), butadiene rubber (BR), chloroprene rubber (CR), nitrile rubber (NBR), butyl rubber (IIR), ethylene propylene rubber (EPT), chlorinated polyethylene, styrene butadiene block copolymer, plasticized polyvinyl chloride, polyurethane, etc. However it is preferably to use natural or synthetic rubbers.

The metal to be used includes gold, silver, copper, aluminum, iron, chromium, manganese, zinc, etc. An alloy of two or more of these metals can also be used.

According to this invention the metal must be in the form of finely divided particles of 10 to 1,000 mesh size, preferably 50 to 300 mesh size.

The metal powder can be mixed with the rubbery elastic material in any well known manner such as by the use of Banbury mixer, mixing roll, kneader, etc. When the rubbery material is a thermoplastic material the metal powder can be mixed therewith by the use of kneader, super mixer or the like while the thermoplastic material is in the molten state. Sometimes the rubbery material may be used in the form of solution, suspension or latex and in such case the metal powder may be mixed therewith simply by the use of a usual mixer.

The amount of the metal powder may vary over a wide range depending upon the particular use of the sheet material, particle size of the metal, sheet workability, etc., and generally may be 10 to 800, preferably 300–600 parts by weight per 100 parts by weight of the rubbery elastic material (as solid).

Generally as the metal particle size becomes larger the electric conductivity of the sheet material upon application of pressure becomes better. However when the metal particle size becomes larger the sheet formation becomes difficult or the physical properties of the sheet material are impaired. Further as the amount of the metal particles in the sheet is increased the electric conductivity of the sheet material upon application of pressure becomes better (i.e. pressure sensitivity is increased). However the use of an excessive amount of metal powder would cause loss of desired physical properties of the sheet material.

If desired, filler, pigment, etc. which are known per se in the art of rubber sheet industry may be added provided that the amount is moderate so as not to unduly adversely affect the desired elastic deformability of the rubbery elastic material. If carbon black is to be added as a filler or pigment the amount should be up to 150 parts by weight per 100 parts by weight of the rubbery elastic material.

The rubbery elastic material may also contain cross-linking agent (or vulcanizing agent), vulcanization assistant, vulcanization accelerator, stabilizer or the like which are well known in the art of rubber industry. Such additive is preferably used when a high strength (e.g. tensile strength) is required for the sheet material. Examples of cross-linking agents are sulfur and sulfur compounds. Examples of vulcanization accelerator are of guanidine type, aldehyde-amine type, thiazole type, imidazoline type, thiourea type, thiuram type, dithiocarbamate type, etc. Examples of vulcanization assistant are zinc oxide, aliphatic acids and their derivatives, and amines. Examples of stabilizer are of amine type, aldehyde-amine type, ketone-amine type, phenol type, etc.

If a foamed sheet material is desired a proper foaming agent (and assistant if desired) which is known per se may be added to the rubbery elastic material. As for the foaming agents inorganic and organic foaming agents which are well known in the art may be used, such as nitroso compounds, azo compounds, sulfonyl hydrazide, etc. with assistant of salicylic acid, urea, etc.

The material and formation of such sheet is well known in the art and does not constitute a novel invention. The important and novel feature of this invention resides in the incorporation of metal powder therein as explained above.

The rubbery elastic material mixed with the metal powder is then formed into a sheet. The word "sheet" as used herein means not only usual sheet but also tape, strip or the like. The sheet may be formed in any known manner such as rolling, extrusion, etc. The thickness of the sheet may vary over a wide range such as from 10 to 500μ.

If desired thus obtained sheet may be heated for cross-linking or vulcanization. At the same time, when the elastic material contains a foaming agent, the sheet will be foamed. This heat treatment can be effected in any proper manner known for the vulcanization and/or foaming of rubber materials. Thus the sheet may be heated at 100°–150° C. in steam or hot air. When foamed the foamed sheet material may have a thickness of 0.3–1.5 mm.

If desired, a fibrous sheet such as woven fabric, knit fabric or non-woven fabric of proper textile fibers e.g. of cotton, nylon, vinylon, polyester, cellulose (rayon, pulp, etc.), etc. may be used to support the pressure sensitive layer. Preferably the thickness of such fibrous layer is 100–300μ.

When such fibrous supporting layer is used the above prepared pressure-sensitive electric conductive layer may be laminated on one or preferably both surfaces of the fibrous supporting layer.

Alternatively a suspension, solution or latex of the rubbery elastic material is applied to the fibrous supporting layer and then dried. This may be effected by spray-coating, roller coating, dipping or the like. In this case it would be preferable to conduct the application in such manner that a thin layer of the pressure-sensitive electric conductive material will be formed on each surface of the fibrous supporting layer of the resulting sheet material.

Further, if desired, a pressure-sensitive electric conductive adhesive layer may be applied to one or both surfaces of the sheet material. This adhesive may be those well known in the art. Generally such adhesive is prepared by adding a tackifier to a base material of natural rubber, synthetic rubber or synthetic resin, which may contain a cross-linking agent, catalyst, etc. Examples of tackifiers are coumarone resins, phenol and terpene resins, petroleum hydrocarbon resins and rosin derivatives.

Such rubber-based adhesives are well known in the art so that no further detailed explanation thereabout would be required. The novel and important feature of this invention is that such adhesive must contain fine particles of electric conductive metal which may be same as those explained in respect of the pressure-sensitive electric conductive rubbery elastic material. However the amount of the metal powder to be added is preferably 10 to 100 parts, more preferably 10 to 50 parts by weight per 100 parts by weight of the adhesive material. The thickness of such adhesive layer is not critical but preferably 30–200μ.

In the drawings, FIGS. 1–3 show schematic cross-sectional views of typical constructions of pressure-sensitive electric conductive sheet material. Thus FIG. 1 shows most simple type of a pressure-sensitive electric conductive sheet material which consists of a single layer 1 of a rubbery elastic material wherein fine particles 2 of a metal are dispersed. This layer 1 may be porous (foamed) as explained before. FIG. 2 is a schematic cross-section of another embodiment of a pressure-sensitive electric conductive sheet material wherein the elastic layer 1 (which may be foamed) of FIG. 1 is applied at its both surfaces with adhesive layers 3,3 with fine metal particles 4 dispersed therein. FIG. 3 shows still another embodiment of the invention which comprises a fibrous supporting layer 5 bonded at each surface with the elastic layer 1 of FIG. 1 and on each elastic layer 1 is applied with an adhesive layer 3, both layers 1 and 3 containing fine metal particles dispersed therein.

The sheet material according to this invention is substantially not electric conductive in normal state because metal particles are substantially isolated or separated from each other by non-conductive rubbery elastic material. However when a pressure is applied vertically thereto the material constituting the sheet would be compressed and depending upon the strength of the pressure the metal particles would come into contact with each other so that the sheet would become electric conductive at those areas where the pressure is applied. Therefore it will be understood that generally as the amount of the metal particles increased and/or as the metal particle size is increased and/or as the pressure to be applied is increased, the electric conductivity would be increased. Generally the electric resistance of the sheet material according to our invention will be changed depending upon the degree of applied pressure, from about $10^8$ Ω-cm (substantially insulative) to 10 Ω-cm or less (electric conductive).

Therefore the sheet material of this invention is useful for various applications where pressure-sensitive electric conductivity is desired. Particularly this sheet material is useful for those applications where elasticity or sealing property is required in addition to pressure-sensitive electric conductivity.

Thus, for example, the pressure-sensitive electric conductive sheet material of this invention is useful as a sealing material between two metal plates (or sheets) which are to be spot welded. More particularly a sheet of this invention may be arranged between and in sealing contact with a pair of metal plates (e.g. for automobile body) which are to be spot-welded. When electrodes are forced against the metal plates the sheet material therebetween would be compressed against its elasticity and the locally compressed area would become electric conductive so that the current is allowed to pass therethrough to effect spot-welding. During the welding operation the sheet material at the weld area would be burnt away and no ash or the like would remain there. The sheet material at those areas which are not spot-welded remain as such between the metal plates and would act as sealing member, shock absorber, waterproof material as well as corrosion preventor.

The invention will be explained more concretely with reference to the following Examples which are given for illustration purpose only and not for limiting the scope of the invention. Throughout the Examples all parts are by weight unless otherwise specified.

EXAMPLE 1

A rubbery elastic material (a blend of isoprene, SBR and butyl rubber) was well blended by Banbury mixer with 400 parts (per 100 parts of the elastic material) of iron powder (particle size distribution 50–200 mesh) and the resulting composition was formed into a sheet of a thickness of the iron particles being denoted by the reference numeral 2 0.3 mm.

A rubber-based adhesive (consisting of natural rubber 100 parts, tackifier 120 parts and stabilizer 1 part) was well blended with 50 parts (per 100 parts of the adhesive) of iron powder 4 (particle size distribution 100–200 mesh) and the resulting composition was uniformly applied to one surface of the above prepared sheet to form an adhesive layer 3 of a thickness of 0.05 mm. to obtain an adhesive rubber tape.

A pressure was vertically applied to this rubber tape and the volume resistivity $\rho_v$ (Ω-cm) at 20° C. was measured after a predetermined pressure (P kg/cm$^2$) was applied. The result is shown in FIG. 4 from which it will be appreciated that when a pressure of 16 kg/cm$^2$ or higher is applied the resistivity becomes 0.5 Ω-cm or less indicating good electric conductivity.

An iron sheet 7 of 1 mm thickness was laminated with an iron sheet 6 of 5 mm thickness with the above prepared adhesive rubber sheet therebetween. The assembly was spot-welded with a rated primary voltage of 480 V and maximum secondary short-circuit current of 25,000 A to form a spot weld 8. At the time of the spot-welding a pressure applied by the electrodes was 160 kg/cm², at which the resistivity of the rubber tape in the vertical cross-section was 0.1 Ω-cm or less so that electric current was allowed to pass to effect the spot-welding. After the spot-welding no ash, slag or the like was observed on the welded area and the weld strength was same as that obtained when the same spot-welding was effected except that the rubber tape was not interposed between the two metal sheets.

EXAMPLE 2

100 parts of a rubbery elastic material (a blend of EPT, BR and IIR) were well blended with 50 parts of carbon black (as filler), vulcanization agent (zinc white 5 parts, stearic acid 1 part, sulfur 2 parts, accelerator 2.5 parts, anti-oxidant 1.5 parts), a foaming agent (organic foaming agent 3 parts and foaming assistant 3 parts) and 300 parts of silver powder (particle size distribution 100-300 mesh).

The blend was formed into a sheet of a thickness of 0.5 mm and heated at 145° C. in a vulcanized to effect the vulcanization and foaming to obtain a rubber sheet having a thickness of 1 mm.

A pair of iron sheets (each 1 × 1 cm × 1 mm thickness) was superposed with the above prepared foamed rubber sheet therebetween. The respective iron sheets were connected through lead lines to a battery. In normal or non-pressed state there was no flow of electric current but when one of the iron sheets was pressed under a pressure of 3-5 kg/cm² there occurred flow of electric current between the two iron sheets through the rubber sheet. This assembly can be used for example as a switch element.

EXAMPLE 3

190 parts of PVC latex (solid content 55%, GEON 576, product of Japan Geon Co., Ltd.) were well mixed with 50 parts of carbon black and 100 parts of iron powder (200 mesh in average particle size) to prepare a latex composition. A polyester non-woven fabric of a thickness of 0.27 mm was dipped into the latex and dried to obtain a sheet (thickness 0.3 mm). Each of the surfaces of this sheet was coated with a natural rubber based adhesive containing 50 parts (per 100 parts of the adhesive material) of iron powder of 200 mesh in average particle size. The thickness of the adhesive layer on each surface was 50μ.

An iron sheet of 2 mm thickness was superposed on an iron sheet of 6 mm thickness with the above prepared adhesive tape therebetween. The assembly was spot-welded with a rated primary voltage of 480 V, maximum secondary short-circuit current of 25 KV, maximum load 160 kg and tip diameter 10 mm. The spot welding could be effected under the same conditions as those without such adhesive tape. The spot-weld strength was comparable with that obtained with the use of such tape as shown in the following Table:

| Sample | With tape | Without tape |
|---|---|---|
| 1 | 2855 kg | 3280 kg |
| 2 | 3090 kg | 3180 kg |
| 3 | 2910 kg | 3300 kg |
| 4 | 3200 kg | 3200 kg |
| 5 | 2630 kg | 3200 kg |
| 6 | 3380 kg | 3270 kg |
| Average | 3010 kg | 3238 kg |

After the welding the adhesive tape remains within and in good contact with the iron sheets and acts as sealing and corrosion-preventing material.

What we claim is:

1. A pressure-sensitive electric conductive sheet material comprising at least one layer of rubbery elastic material and an adhesive layer disposed on at least one of the surfaces of said sheet, both layers having substantially uniformly distributed fine particles of electric conductive metal, the quantity and size of said metal particles being such that the electrical conductivity of said sheet is sensitive to pressure.

2. A pressure-sensitive electric conductive sheet material according to claim 1, wherein said layer of rubbery elastic material is foamed.

3. A pressure-sensitive electric conductive sheet material according to claim 1 or 2 further comprising a fibrous supporting layer attached to at least one surface of said layer of rubbery elastic material.

4. A pressure-sensitive electric conductive sheet material according to claim 1 or 2 wherein the amount of the metal particles is 10 to 800 parts by weight per 100 parts by weight of the rubbery elastic material.

5. A pressure-sensitive electric conductive sheet material according to claim 1 or 2 wherein the amount of the metal particles is 300-600 parts by weight per 100 parts by weight of the rubbery elastic material.

6. A pressure-sensitive electric conductive sheet material according to claim 1 wherein the particle size of the fine metal particles is 10 to 1,000 mesh.

7. A pressure-sensitive electric conductive sheet material according to claim 1 wherein the particle size is 50 to 300 mesh.

8. A pressure-sensitive electric conductive sheet material according to claims 1 or 2 wherein the amount of the metal particles in said adhesive layer is 10 to 100 parts by weight per 100 parts by weight of said adhesive layer.

9. A pressure-sensitive electric conductive sheet material according to claim 2 wherein the metal particle size is 10 to 1,000 mesh.

10. A pressure-sensitive electric conductive sheet material according to claim 3 wherein the amount of the metal particles is 10 to 800 parts by weight per 100 parts by weight of the rubbery elastic material.

11. A pressure-sensitive electric conductive sheet material according to claim 3, including two layers of said rubbery elastic material and said fiberous supporting layer disposed between said rubbery elastic layers and further comprising two adhesive layers wherein are substantially uniformly distributed fine particles of electric conductive metal, said adhesive layers disposed on the outer surfaces of said rubbery elastic layers.

12. A pressure-sensitive electric conductive sheet material according to claim 11 wherein the amount of the metal particles in said adhesive layer is 10 to 100 parts by weight per 100 parts by weight of said adhesive layer.

13. A pressure-sensitive electric conductive sheet material according to claim 12 wherein the metal particle size is 10 to 1,000 mesh.

14. A pressure-sensitive electric conductive sheet material according to claim 12 wherein the amount of the metal particles is 300-600 parts by weight per 100 parts by weight of the rubbery elastic material.

* * * * *